United States Patent [19]

Loveless, Jr.

[11] 4,162,684
[45] Jul. 31, 1979

[54] SOLAR ICE MELTER FOR USE AT LOW AMBIENT TEMPERATURES

[76] Inventor: Charles C. Loveless, Jr., 1508 W. 8th St., Roswell, N. Mex. 88201

[21] Appl. No.: 853,650

[22] Filed: Nov. 21, 1977

Related U.S. Application Data

[63] Continuation-in-part of Ser. No. 840,312, Oct. 7, 1977, abandoned.

[51] Int. Cl.$^2$ ............................ A01K 7/00; F24J 3/02
[52] U.S. Cl. ...................................... 119/73; 126/271; 165/105; 165/106
[58] Field of Search ................. 119/73; 165/105, 106; 126/271, 270

[56] References Cited

U.S. PATENT DOCUMENTS

| | | | |
|---|---|---|---|
| 2,466,135 | 4/1949 | Townsend | 119/73 |
| 4,067,315 | 1/1978 | Fehlner | 165/105 |
| 4,108,156 | 8/1978 | Sitter | 119/73 |
| 4,119,085 | 10/1978 | Knowles et al. | 165/105 |

Primary Examiner—Jay N. Eskovitz
Attorney, Agent, or Firm—Arnold, White & Durkee

[57] ABSTRACT

An apparatus for using solar energy to melt ice at low ambient temperatures, particularly adapted for use in livestock watering systems, is disclosed. A solar energy collector of structure described herein gathers and transmits heat into ice which has formed in a watering receptacle at ambient air temperatures of freezing or below.

5 Claims, 2 Drawing Figures

SOLAR ICE MELTER FOR USE AT LOW AMBIENT TEMPERATURES

This application is a continuation-in-part of my prior application Ser. No. 840,312, filed Oct. 7, 1977, now abandoned.

BACKGROUND OF THE INVENTION

My invention generally relates to a device using solar energy to melt ice at low ambient temperatures (freezing or below), and more particularly to apparatus for dispensing drinking water to livestock grazing on remote pastures in climates or at elevations where low ambient temperatures frequenty cause the water in livestock water troughs to freeze.

The loss of livestock during cold weather is a problem that plagues ranchers particularly in the Rocky Mountains, where it is often difficult to gain ready access to the grazing areas. The watering troughs often freeze during very cold nights, preventing the livestock from drinking the water during the day and causing death of livestock through thirst. The current practice is to melt the ice by the use of propane heaters, which are not fully reliable in cold weather. Adverse weather conditions may also prevent supplying fuel to these heaters. The use of electric heaters is impracticable because of the cost of electricity and the impossibility of installing power lines to the grazing areas.

Solar energy is not presently in use as a source of heat to melt stock water in remote low-temperature grazing ranges, because persons in the art have not heretofore considered solar melting to be effective in preventing livestock loss in areas of low ambient air temperatures.

SUMMARY OF THE INVENTION

I have invented a device for watering animals that is specifically adapted for use at low ambient air temperatures, freezing or below, at which the water in the watering receptacle, such as a stock tank or watering trough, is at least partially frozen. The device, which comprises an open receptacle containing ice (whether liquid water is present or not) to which is rigidly fixed a solar energy collector disposed to transmit heat from solar energy into the ice contained in the receptacle, both melts ice-bound water and allows the livestock to drink from it. The device is substantially oriented toward the southeast (in the Northern Hemisphere at latitudes above the Tropic of Cancer) so as to receive maximum energy from the rising sun, since early morning is the time of day during which freezing of livestock water is the greatest problem. The precise directional orientation of the collector will vary depending on the latitude, as will the angle above the horizontal subtended by the solar energy collector.

The solar collector of my invention starts with an outer shell with insulation packed inside its side walls. Inside the outer shell and surrounded by the insulation is a wooden collector box which is open on its upper face, which faces toward the sun when the solar energy collector is in place. Another mass of insulation lines the collector box. On top of this mass of insulation in the collector box, on the sunward side of the solar energy collector when in use, is a heat-conducting absorber surface which receives and absorbs energy from the sunlight striking it. To the absorber surface is affixed a heat pipe, which receives heat from the absorber surface and transmits the heat along its length into the ice contained in the open watering receptacle. The entire solar energy collector is covered with a planar sheet of transparent material or with two or more parallel planar sheets of transparent material spaced so as to provide an air gap between each adjacent pair of sheets.

My device may also be provided with a radiation shield attached by one or more hinger to the watering receptacle so that it may be swung to cover the watering receptacle during winter nights or to cover the solar energy collector during the summer.

It is also apparent that my invention includes the method of melting ice at low ambient temperatures by the use of the apparatus disclosed herein.

One of the features of my invention is the provision of an inexpensive and easily fabricated animal watering device suitable for use on remote grazing ranges where electricity and other sources of power are different or impossible to install.

Another feature of my invention is the provision of an animal watering device that uses solar energy to melt completely or render drinkable stock water in watering tanks or troughs that are subject to freezing in low ambient air temperatures.

My invention also provides an animal watering device that makes stock water available to the animals at a sufficiently high temperature that the animals do not waste energy heating the water to body temperature, thus reducing weight loss and increasing the efficiency of the animals' use of their feed.

My invention includes as an optional feature a radiation shield for the purposes of reducing heat loss from the stock water during winter nights and of shielding the solar energy collector during the summer to prevent overheating or boiling of the water from the heat conducted to it by the solar energy collector.

These features and other advantages of my invention will be apparent to persons skilled in this art from reading the specification and the claims appended hereto.

DETAILED DESCRIPTION OF THE PREFERRED EMBODIMENT

Figure 1:
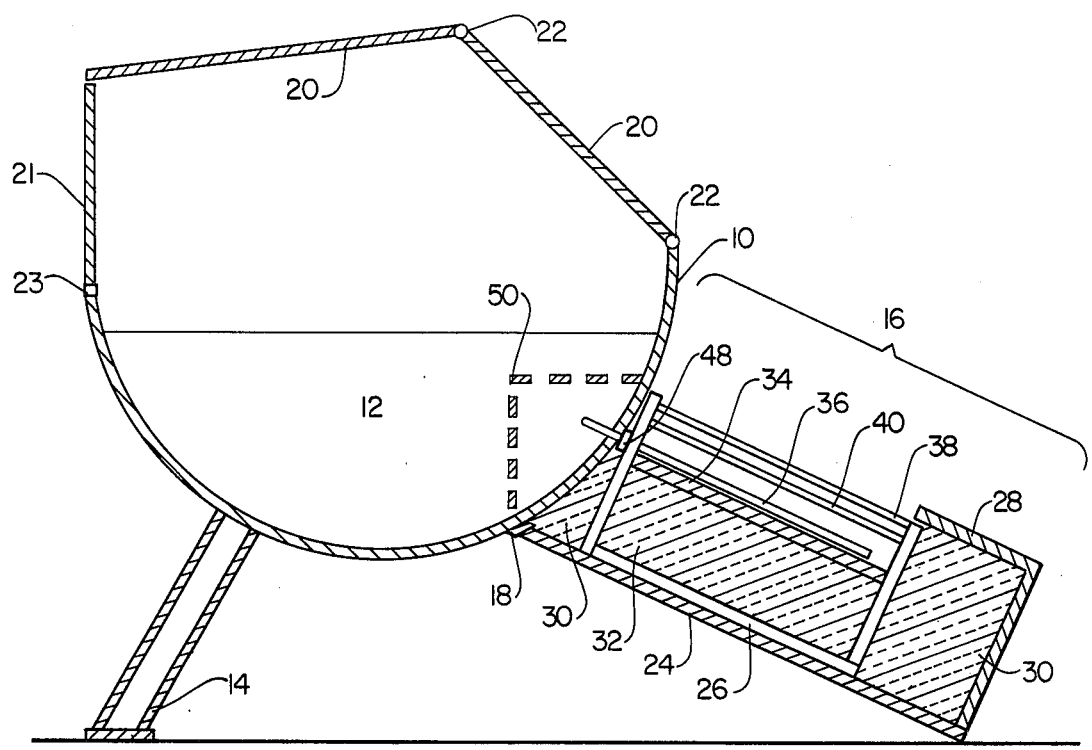
FIG. 1 is a cross sectional view of a preferred embodiment of my invention.

The embodiment depicted in the drawings shows my invention in use as a livestock watering trough 10 filled with water 12. The trough is supported in part by a pipe leg 14 and other legs not depicted, and in part by the solar collector 16 which is welded at point 18 to the watering trough 10. The solar collector 16, and the heat pipe 36 therein, must extend to the ground at an angle at least 3 degrees above the horizontal so that the heat pipe 36 is operable. A two-part nocturnal radiation shield 20 and 20', which is of a size and shape to cover the surface of trough 10 completely, is attached to the trough by hinge 22. The free end of radiation shield 20' is supported by a column 21 welded to the trough 10 at point 23. Other support columns may be necessary, but they are not depicted. The two halves 20 and 20' of the radiation shield are hinged at 22'. The inner surfaces of shield haves 20 and 20' are painted with aluminum or other reflecting paint. The function of radiation shield 20 and 20' is discussed below. Enclosure 50 within the trough 10 protects the heat pipe 36 from being damaged by the livestock.

The shell 24 of the solar collector 16 is preferably of cold rolled steel of thickness adequate to provide support to the watering trough. Affixed to shell 24 is an insulating wooden collector box 26 which is fitted to the bottom of shell 24 snugly down to the edge of overhand 28. I have found ½ inch stock to be satisfactory as well as inexpensive for collector box 26. The empty space encompassed by overhang 28 below the fitted collector box 26 is filled with glass wood insulation 30. The insulation 30 may be of 2½ inch thickness, and completely surrounds the collector box 26 on the bottom and sides (not shown). An aluminum sheet 34, painted black to provide maximum reception of solar energy, rests on top of the insulation 32. This sheet 34 acts as an absorber surface for incident solar radiation.

Solar energy impinging on the collector 16 is taken up by a closed heat pipe 36, which is also painted black and attached to sheet 34 by means of U-bolts (not shown). The top of the collector is covered and enclosed by double glass or plastic panes 38 and 40. The double panes provide an insulating air space while preventing direct long wave radiation transfer from the aluminum sheet 34 back to the sky, which can have an effective temperature as much as 20° F. less than the ambient air temperature. More than two panes may be used. A single pane is also acceptable for lower cost installations. Transmission of heat from the sheet 34 to heat pipe 36 may be improved by applying a silicon thermal putty between the sheet and the pipe (not shown). Depending on the size of the watering trough, more than one heat pipe may be used in each solar collector, although I contemplate using only one collector assembly for each trough in order to reduce cost and difficulty of fabrication. More than one collector may be used for each trough if conditions so require.

Figure 2:
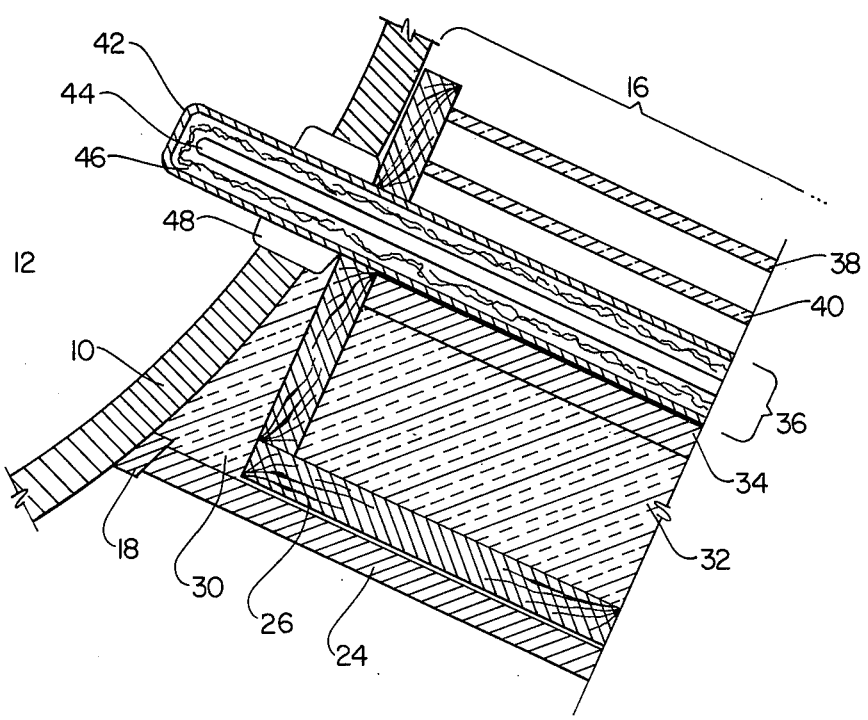
FIG. 2 is an enlarged view of FIG. 1 showing more particularly the structure of the solar energy collector and its connection with a livestock watering trough.

FIG. 2 shows in greater detail the structure of heat pipe 36 and its interface with trough 10. The heat pipe depicted comprises an aluminum outer shell 42 and an inner channel 44, which may also be formed by a thin aluminum tube open at each end. Around the inner channel is a capillary wick medium 46. The depicted heat pipe employs Freon-12 as the working medium. In operation, the heat from the solar energy gathered by the collector evaporates the freon in the portion of the heat pipe surrounded by the collector. The freon expands away from the collector end of the heat pipe and condenses at the end of the heat pipe which extends into the water in the trough, liberating heat of condensation into the water. The condensed freon travels back to the collector end through the wick medium 46, where it again evaporates and begins the cycle anew. It is possible also to dispense with the wick and to allow the condensed freon to return to the bottom of the heat pipe by gravity. Because of the low ambient air temperature and the necessity for keeping water from leaking from the trough at the hole through which the heat pipe enters, the junction is protected and insulated by a gasket or caulking compound 48 forming a tight seal around the heat pipe and with the trough.

When temperatures fall at night, particularly at high elevations, stock water rapidly freezes, and melting the next morning is more difficult, unless the surface of the water is covered to minimize radiation of heat into the surrounding air. I have found that a hinged steel nocturnal radiation shield 20 and 20', which so covers the surface of the trough that the surface of the water therein is not exposed to the open sky while still allowing animals access to the water in the trough, is an effective means for reducing heat loss on cold nights. If the radiation shield is hinged on the side of the trough to which the solar energy collector is affixed, as shown in FIG. 1, it may be laid back over the collector during the spring and summer months so that the solar energy collected does not cause the stock water to become too hot for the animals to drink.

Although the portion of my preferred embodiment depicted in FIG. 2 uses a heat pipe without a melting head attached to it, thermal contact between the end of the heat pipe inside the trough and the ice layer in the trough may be improved by affixing metal blades to the end of the heat pipe which are so positioned as to be imbedded in the ice layer formed on the surface of the water as it freezes. The blades must be shaped so as to allow the animals to free the block of ice and gain access to the water by pushing down on the block as they attempt to drink.

Since early morning is the time when ice melting is most desired, I have found that optimum morning exposure to the winter sun is achieved by aligning the troughs with their solar collectors to face the direction of the morning sun, substantially to the southeast, and not to the south as is shown in the prior art. Similarly, optimum results are achieved when the collector is angled from the trough so as to receive the maximum solar radiation during the early to mid-morning hours. This angle will be determined in part by the heat pipe design selected and the configuration of the trough or tank itself, but optimum angles may be readily calculated from ephemeris data for a given latitude and day of the year. It has been found, for latitude 36 degrees North on December 21, for example, that the optimum angle from the vertical for the collector is 60 degrees, approximately as depicted in the drawings. Shallower angles are suitable if melting times later in the day are acceptable. At the 60-degree orientation, field tests conducted at 7000 feet elevation have demonstrated that with ambient air temperatures about +5° F. on sunny mornings apparatus constructed in accordance with my invention will melt stock water within about 2 hours after sunrise.

The foregoing description of the invention has been directed to a particular embodiment in accordance with the requirements of the Patent Act and for purposes of explanation and illustration. It will be apparent, however, to those skilled in the art that many modifications and changes may be made without departing from the scope and spirit of my invention. For example, it is obvious from my disclosure that modifications in the disclosed embodiment of my invention necessary to satisfy the needs of any particular application, whether in scaling the apparatus up or down in size, or in using collector angles and directional orientations suited for the particular latitude, or in using a particular heat pipe design, or in using materials other than those specifically disclosed, are within the state of the art. It is my intention in the following claims to cover all such modifications and variations as fall within the true scope and spirit of my invention.

What is claimed is:

1. A device for watering animals from a suitable water receptacle adapted for use at low ambient air temperatures at which the water in the receptacle is at least partially frozen, comprising:
   an open receptacle containing ice;

a solar energy collector rigidly fixed to said receptacle and disposed to transmit heat into the ice contained in said receptacle, wherein said receptacle and said solar energy collector are oriented to face in a substantially southeasterly direction and at an angle above the horizontal so as to receive maximum energy from the morning sun;

an outer shell having first insulation means disposed inside its peripheral walls;

a wooden collector box open along its upper face, disposed inside said outer shell and surrounded about its periphery by said first insulation means;

second insulation means lining the bottom of said collector box;

a heat-conducting absorber surface prepared to absorb impinging solar radiation and disposed sunward of said second insulation means;

a heat pipe affixed to said absorber surface so as to receive heat therefrom and dispose to conduct heat into the ice contained in said receptacle; and a cover over said outer shell comprising at least one sheet of a transparent material.

2. The device of claim 1, wherein said cover comprises at least two parallel spaced planar sheets of a transparent material.

3. The device of claim 2, further comprising a radiation shield which is hingedly fixed to said receptacle and which is of a size and shape that can cover both the open surface of said receptacle and the said cover over said outer shell.

4. The device of claim 2, further comprising a melting head attached to the end of said heat pipe which is disposed to conduct heat into the ice contained in said receptacle.

5. The device of claim 3, further comprising a melting head attached to the end of said heat pipe which is disposed to conduct heat into the ice contained in said receptacle.

* * * * *

UNITED STATES PATENT AND TRADEMARK OFFICE
CERTIFICATE OF CORRECTION

PATENT NO. : 4,162,684

DATED : July 31, 1979

INVENTOR(S) : Charles C. Loveless, Jr.

It is certified that error appears in the above-identified patent and that said Letters Patent are hereby corrected as shown below:

In Column 3, line 11, "wood" should read -- wool --.

Signed and Sealed this

Thirteenth Day of November 1979

[SEAL]

Attest:

RUTH C. MASON
Attesting Officer

LUTRELLE F. PARKER
Acting Commissioner of Patents and Trademarks